(12) United States Patent
Nakahashi et al.

(10) Patent No.: US 9,452,554 B2
(45) Date of Patent: Sep. 27, 2016

(54) MOLDED PRODUCT MANUFACTURING APPARATUS, AND MOLDED PRODUCT MANUFACTURING METHOD

(71) Applicant: SHARP KABUSHIKI KAISHA, Osaka-shi, Osaka (JP)

(72) Inventors: Takahiro Nakahashi, Osaka (JP); Hiroyuki Hanato, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/353,703

(22) PCT Filed: Oct. 4, 2013

(86) PCT No.: PCT/JP2013/077166
§ 371 (c)(1),
(2) Date: Apr. 23, 2014

(87) PCT Pub. No.: WO2014/073304
PCT Pub. Date: May 15, 2014

(65) Prior Publication Data
US 2015/0021829 A1  Jan. 22, 2015

(30) Foreign Application Priority Data
Nov. 9, 2012 (JP) ................. 2012-247845

(51) Int. Cl.
*B29C 43/58* (2006.01)
*B29C 43/02* (2006.01)
*B29C 43/00* (2006.01)
(Continued)

(52) U.S. Cl.
CPC .............. *B29C 43/58* (2013.01); *B29C 35/02* (2013.01); *B29C 35/0288* (2013.01); *B29C 37/0003* (2013.01); *B29C 43/003* (2013.01); *B29C 43/021* (2013.01); *B29C 2043/025* (2013.01);
(Continued)

(58) Field of Classification Search
CPC ............... B29C 2043/5808; B29C 2043/5816
See application file for complete search history.

(56) References Cited

U.S. PATENT DOCUMENTS 4,940,563 A * 7/1990 Kromrey ................. 264/257
2010/0289161 A1   11/2010 Yamada et al.
(Continued)

FOREIGN PATENT DOCUMENTS

JP       60-038117     2/1985
JP       2004-074445   3/2004
(Continued)

OTHER PUBLICATIONS

International Search Report for PCT/JP2013/077166 mailed Jan. 7, 2014.
(Continued)

*Primary Examiner* — Alison L Hindenlang
(74) *Attorney, Agent, or Firm* — Nixon & Vanderhye P.C.

(57) ABSTRACT

A molded product manufacturing method and a molded product manufacturing apparatus are realized, each of which has improved quality and productivity of a molded product. A pressure to be applied to an upper mold (ML) and a lower mold (ML) is reduced in stages during a process from a start of decrease in internal temperatures of the upper mold (ML) and the lower mold (ML) to a complete mold-release of a resin component (W). This prevents an excessive load from being applied to the resin component (W) which has been molded but has not been mold-released.

1 Claim, 6 Drawing Sheets

(51) Int. Cl.
*B29C 35/02* (2006.01)
*B29C 37/00* (2006.01)
*B29L 11/00* (2006.01)

(52) U.S. Cl.
CPC .............. *B29C 2043/5808* (2013.01); *B29C 2043/5816* (2013.01); *B29L 2011/0016* (2013.01)

(56) References Cited

U.S. PATENT DOCUMENTS

2011/0134531 A1   6/2011   Takasu et al.
2012/0133067 A1*  5/2012   Ashida .................. 264/40.3
2013/0082411 A1   4/2013   Nakahashi et al.

FOREIGN PATENT DOCUMENTS

| | | |
|---|---|---|
| JP | 2008-200928 | 9/2008 |
| JP | 2010-173196 | 8/2010 |
| JP | 2010-264652 | 11/2010 |
| JP | 2010-266665 | 11/2010 |
| JP | 2011-116598 | 6/2011 |
| JP | 2013-006398 | 1/2013 |
| JP | 2013-075499 | 4/2013 |
| WO | 2011/083331 A2 | 7/2011 |

OTHER PUBLICATIONS

Written Opinion of the International Searching Authority mailed Jan. 7, 2014.

* cited by examiner

FIG. 6

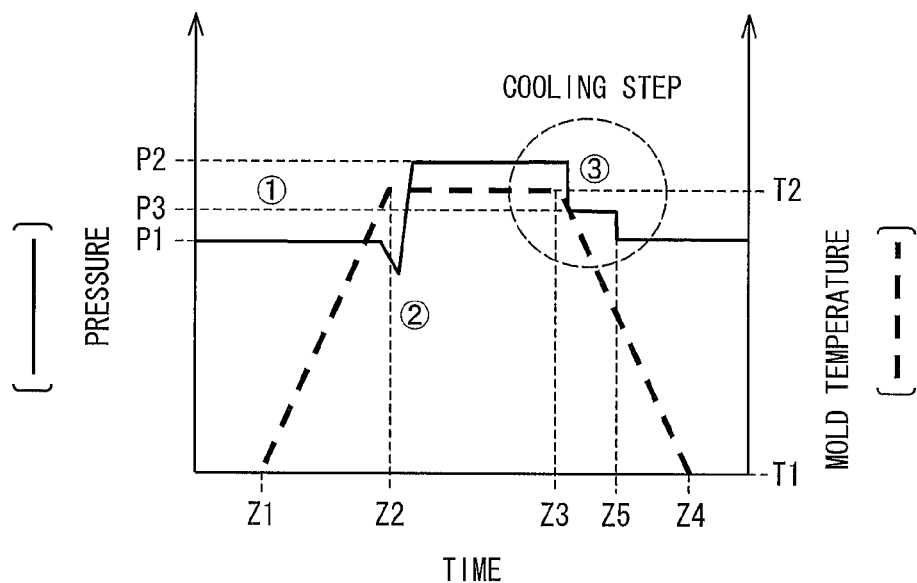

FIG. 7

| STEP | CURING BEHAVIOR | |
|---|---|---|
| | PROPERTY AND CONDITION OF RESIN | STATE |
| TEMPERATURE INCREASING STEP ① | GEL STATE INDEFINITELY-SHAPED SOLID STATE | DUE TO NO FLUIDITY, RESIN IS BASICALLY IN GEL STATE OR IN INDEFINITELY-SHAPED SOLID STATE. DUE TO LOW REACTION RATE, SPECIFIC VOLUME OF RESIN IS EASILY AFFECTED BY MOLD TEMPERATURE. |
| PRESSING STEP ② | GEL STATE TO RUBBER-LIKE STATE | PRESS MOLD 'STRONGLY' TO TRANSFER MOLD SHAPE TO RESIN. TIMING IS IMPORTANT BECAUSE SPECIFIC VOLUME AND ELASTIC MODULUS OF RESIN DEPEND ON REACTION RATE OF RESIN. |
| CURING STEP ③ | STATE OF CURING | RESIN SHRINKS IN STATE WHERE RESIN IS FORCIBLY PRESSED BY MOLD. DISTORTION REMAINS IN RESIN. |

MOLDED PRODUCT MANUFACTURING APPARATUS, AND MOLDED PRODUCT MANUFACTURING METHOD

This application is the U.S. national phase of International Application No. PCT/JP2013/077166 filed Oct. 4, 2013 which designated the U.S. and claims priority to JP 2012-247845 filed Nov. 9, 2012, the entire contents of each of which are hereby incorporated by reference.

TECHNICAL FIELD

The present invention relates to (i) a molded product manufacturing apparatus for manufacturing a molded product by use of a mold and (ii) a molded product manufacturing method for manufacturing a molded product by use of a mold. The present invention particularly relates to (i) an apparatus for manufacturing a wafer level lens array made of a resin and (ii) a method for manufacturing a wafer level lens array made of a resin.

BACKGROUND ART

A method for manufacturing a molded product by use of a mold has been broadly applied to, for example, mass production of molded products which have a predetermined shape and are made of resin, glass, metal or the like as a main material.

Recently, optical lenses which are made of resin and are used in various electronic devices such as (i) an optical pickup of an optical disk (such as CD or DVD) drive and (ii) a small-sized camera provided in a mobile terminal device have been manufactured by use of molds. Most of the optical lenses are manufactured by (i) applying or pouring a resin (optical polymer) to a mold and then (ii) curing the resin in the mold.

For example, a mobile terminal device can reduce not only its weight and size but also manufacturing cost by employing a lens which has been mass produced by use of a mold. There has been particularly known, as a method for manufacturing a plurality of small-sized lenses, a method for manufacturing a wafer level lens array by applying or pouring a material for lenses, i.e., a resin to arranged molds for molding the lenses. What is meant by "wafer level lens array" is a molded product formed by integrating a substrate part with a plurality of lenses. Generally, the plurality of lenses are connected to each other via the substrate part. The plurality of lenses thus formed can be mass produced by (i) releasing the wafer level lens array from a mold (mold release) and then (ii) separating the wafer level lens array into the plurality of lenses by cutting the substrate part between the respective plurality of lenses.

Meanwhile, according to such a method for manufacturing a wafer level lens array, there may be a case where a wafer level lens array (molded product) cannot be released from a mold because the wafer level lens array strongly adheres to the mold. An external force to be applied to release the wafer level lens array from the mold will, for example, damage the lenses, scratch surfaces of the lenses, or deform spherical surfaces of the lenses (such deformation of the spherical surfaces will cause lens aberration). This may impair optical properties of the lenses. It is therefore significant to smoothly release the wafer level lens array from the mold so as to secure quality and productivity of the lenses.

Patent Literature 1 describes a wafer level lens array manufacturing method including the step of releasing a molded product from a pair of molds by (i) cooling one of the pair of molds while or before the molded product is released from the pair of molds, or (ii) simultaneously cooling and ultrasonically vibrating one of the pair of molds.

Patent Literature 2 discloses a method for molding a resin material into a molded resin product by use of a pair of molds between which the resin material is sandwiched, the method including the step of releasing the molded resin product from one of the pair of molds by decreasing a temperature of the one of the pair of molds by a predetermined temperature.

Patent Literature 3 discloses a method for easily releasing a molded resin product from a casting mold by (i) bringing the molded resin product into direct contact with a planar vibrator, and (ii) transmitting sound or ultrasonic vibrations to the molded resin product and also indirectly to the casting mold.

Patent Literature 4 discloses (i) a mold for press molding an optical lens and (ii) a method for manufacturing an optical lens made of glass, the mold and the method each being used to manufacture a diffraction lens having a plurality of concentric circular bands. The mold has a diffraction effect transfer surface and a stair transfer surface. The stair transfer surface is coarser than the diffraction effect transfer surface. This reduces a stress to be applied to a lens material in releasing the lens material from the mold. It is therefore possible to prevent the glass from adhering to the mold.

CITATION LIST

Patent Literatures

Patent Literature 1
Japanese Patent Application Publication, Tokukai, No. 2010-266665 A (Publication Date: Nov. 25, 2010)
Patent Literature 2
Japanese Patent Application Publication, Tokukai, No. 2010-173196 A (Publication Date: Aug. 12, 2010)
Patent Literature 3
Japanese Patent Application Publication, Tokukai, No. 2004-074445 A (Publication Date: Mar. 11, 2004)
Patent Literature 4
Japanese Patent Application Publication, Tokukai, No. 2011-116598 A (Publication Date: Jun. 16, 2011)

SUMMARY OF INVENTION

Technical Problem

However, it cannot be said that the conventional techniques are methods for smoothly and easily releasing, from a mold, high-quality lenses made of a resin material which excels in optical properties such as high light transmittance and high refraction while preventing a deterioration in quality and productivity of the lenses.

Specifically, according to the releasing steps described in Patent Literatures 1 and 2, rapid cooling of a mold causes a difference in temperature (i) between a molded product and the mold and (ii) inside the molded product. This easily deforms or damages the molded product. It will therefore be impossible to manufacture a lens having a high-precision shape.

Meanwhile, according to the release method described in Patent Literature 3, vibrations are transmitted to the molded product while a molded product is in direct contact with a vibrator, so that lenses may be damaged by the contact with the vibrator or the vibrations.

Since there is a restriction on the shape of a mold which is used in the release method described in Patent Literature 4, it is difficult to apply the release method described in Patent Literature 4 to purposes other than the purpose of manufacturing a diffraction lens having a plurality of concentric circular bands.

The present invention was made in view of the problems, and an object of the present invention is to realize a molded product manufacturing apparatus and a molded product manufacturing method each of which, while preventing a deterioration in quality and productivity of a lens, can smoothly release, from a mold, the lens which has strongly adhered to the mold. The molded product manufacturing apparatus and the molded product manufacturing method are respectively a wafer level lens array manufacturing apparatus and a wafer level lens array manufacturing method each for manufacturing a wafer level lens array that excels in optical properties such as a high light transmittance and a high refraction.

Solution to Problem

In order to attain the object, a molded product manufacturing apparatus in accordance with an aspect of the present invention is configured to include: a mold for molding a heat-curable resin; a pressure control section for controlling a pressure which is applied to the mold; and a temperature control section for controlling an internal temperature of the mold, the temperature control section maintaining a heating temperature of an interior of the mold at a given temperature while a curing reaction of the heat-curable resin is progressing so that the heat-curable resin is molded, and thereafter, during a process for decreasing the internal temperature of the mold, the pressure control section reducing in stages the pressure which is being applied to the mold.

In order to attain the object, a molded product manufacturing method in accordance with an aspect of the present invention is configured to be a molded product manufacturing method for manufacturing a molded product by heating and pressurizing a heat-curable resin in a mold, the molded product manufacturing method including the steps of: maintaining a heating temperature of the mold at a given temperature while a curing reaction of the heat-curable resin is progressing so that the heat-curable resin is molded; and thereafter, during a process for decreasing a temperature of the mold, reducing in stages a pressure which is being applied to the mold.

Advantageous Effects Of Invention

According to an aspect of the present invention, it is possible to bring about an effect of smoothly and easily mold-releasing a molded product while preventing a deterioration in quality and productivity of the molded product.

BRIEF DESCRIPTION OF DRAWINGS

FIG. 6 is a view schematically illustrating how (i) a pressure (pressing force) to be applied to a resin and (ii) a temperature of a mold (mold temperature) change over time during the manufacturing of the wafer level lens array of FIG. 5.

FIG. 7 is a table showing main curing behaviors of a resin in respective temperature increasing, pressing, and curing steps carried out in a wafer level lens array manufacturing method of FIG. 6.

DESCRIPTION OF EMBODIMENTS

The following description will discuss, with reference to FIGS. 1 through 8, an example in which the present invention is applied to a wafer level lens array manufacturing apparatus for manufacturing a wafer level lens array which is made of a resin (a molded product manufacturing apparatus).

[Embodiment 1]

(Schematic Configuration of Wafer Level Lens Array Manufacturing Apparatus)

Figure 1:
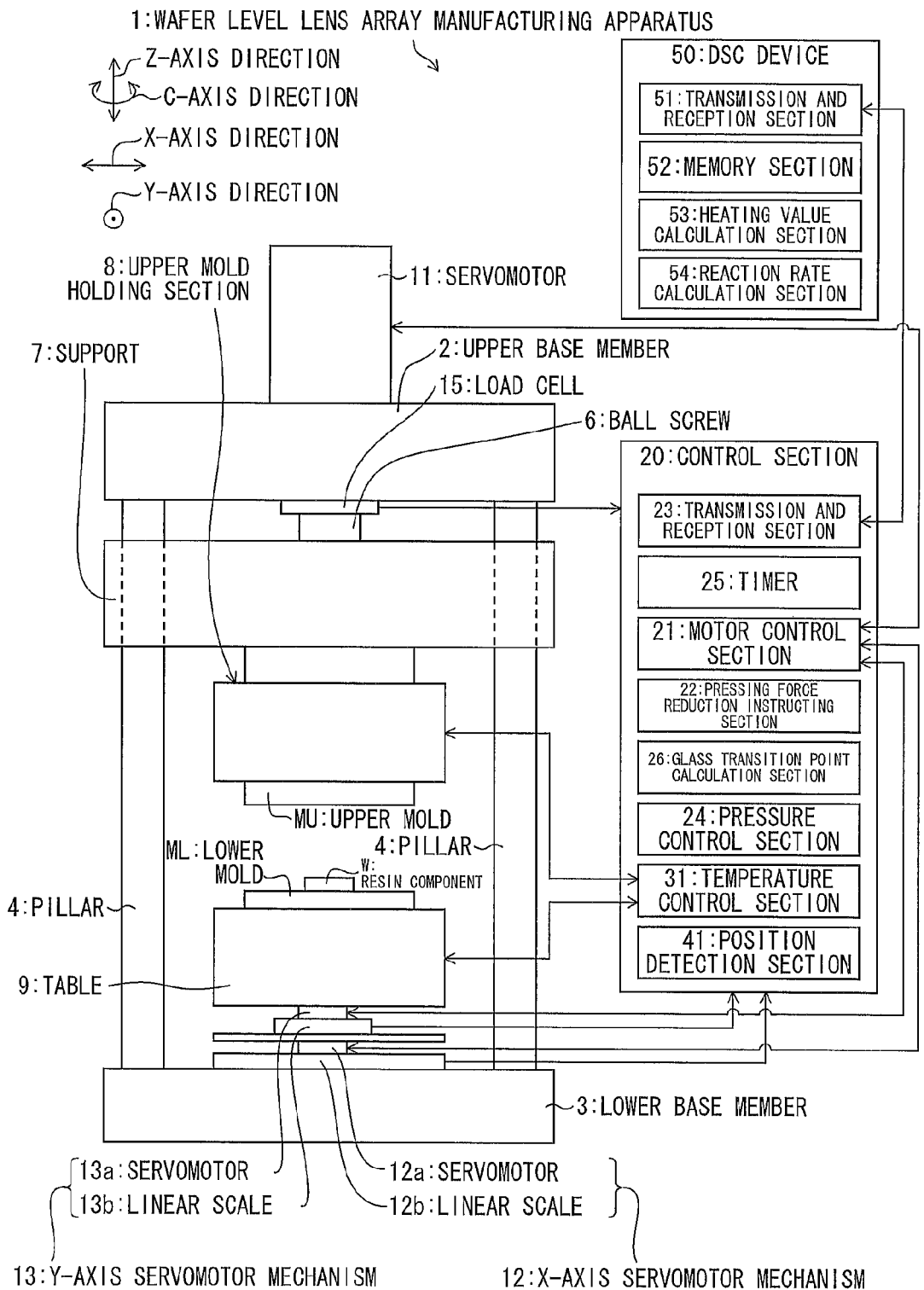
FIG. 1 is a view illustrating a configuration of a wafer level lens array manufacturing apparatus in accordance with an aspect of the present invention.

A configuration of a wafer level lens array manufacturing apparatus 1 will be described below with reference to FIG. 1. FIG. 1 is a view illustrating a configuration example of the wafer level lens array manufacturing apparatus 1 of Embodiment 1, the wafer level lens array manufacturing apparatus 1 provided with a DSC (differential scanning calorimetry) device 50.

The configuration of the wafer level lens array manufacturing apparatus 1 will be described below, by use of an X-axis direction, a Y-axis direction, and a Z-axis direction which are orthogonal to each other, and by use of a C-axis direction that is a rotation direction. The Z-axis direction is an upward and downward direction (vertical direction) of FIG. 1, and orthogonal to each of the X-axis direction, the Y-axis direction, and the C-axis direction. That is, the X-axis direction and the Y-axis direction are linear directions orthogonal to each other in a plane orthogonal to the Z-axis direction. The C-axis direction is a direction of rotation about a rotation axis parallel to the Z-axis direction. The X-axis direction is a horizontal direction of FIG. 1. The Y-axis direction is a direction orthogonal to the X-axis direction. Assume that a vertically downward direction of the Z-axis direction is a first direction, and a direction orthogonal to the Z-axis direction (i.e., the X-axis direction or the Y-axis direction) is a second direction.

The wafer level lens array manufacturing apparatus 1 includes (i) an upper base member 2, (ii) a lower base member 3 which is provided so as to be lower than the upper base member 2, (iii) a plurality of pillars 4 which connect the upper base member 2 and the lower base member 3 to each other, (iv) a support 7 which is provided so as to move up and down, (v) an upper mold holding section 8 which is provided so as to face a surface of the support 7 which surface faces the lower base member 3, and (vi) a table 9 which is provided so as to face a surface of the lower base member 3 which surface faces the support 7.

The wafer level lens array manufacturing apparatus 1 further includes (i) a ball screw 6 and a servomotor 11 (first driving section) which are provided so as to move the support 7 and the upper mold holding section 8 in the Z-axis direction, (ii) an X-axis servomotor mechanism 12 for moving the table 9 in the X-axis direction, (iii) a Y-axis servomotor mechanism 13 for moving the table 9 in the Y-axis direction, (iv) a load cell 15, and (v) a control section 20. The table 9 moves in the C-axis direction, in addition to the X-axis direction and the Y-axis direction. The wafer level lens array manufacturing apparatus 1 further includes a C-axis moving mechanism (not illustrated) for moving the table 9 in the C-axis direction.

The control section 20 carries out driving control with respect to driving sections of the wafer level lens array manufacturing apparatus 1. The control section 20 includes a motor control section 21, a pressing force reduction instructing section 22, a glass transition point calculation section 26, a temperature control section 31, a position detection section 41, a transmission and reception section 23, a pressure control section 24, and a timer 25.

The motor control section 21 controls driving of the servomotor 11 and respective servomotors of the X-axis servomotor mechanism 12 and the Y-axis servomotor mechanism 13, and controls movement of the table 9 in the C-axis direction. Note that the motor control section 21 will be later described when a configuration of the timer 25 etc. is described.

The pressure control section 24 controls a pressure which is being applied to a resin component W. The pressure control section 24 obtains, from the load cell 15 (later described), how much pressure (pressing force) is to be applied to a resin component W. Then, the pressure control section 24 gives an instruction to the motor control section 21 so that the pressure equals to a predetermined pressing force. Note that it is desirable in this case not to change relative positions of the resin component W, an upper mold MU, and a lower mold ML.

The temperature control section 31 carries out temperature control with respect to the upper mold MU and the lower mold ML.

The pressing force reduction instructing section 22 determines, in accordance with a relationship (specifically described later with reference to FIG. 4) between a curing reaction rate (degree of cure) of the resin component W (not less than 80%) and a glass transition point (Tg) of the resin component W, (i) a temperature at which the pressing force is reduced and (ii) a temperature at which the resin component W is mold-released. Note that the wafer level lens array manufacturing apparatus 1 preferably includes means for measuring a temperature of the resin component W. Alternatively, the pressing force reduction instructing section 22 can (i) obtain respective temperatures of the upper mold MU and the lower mold ML, which temperatures are controlled by the temperature control section 31, and (ii) determine whether the obtained temperatures are equal to the temperature at which the pressing force is reduced or to the temperature at which the resin component W is mold-released.

When the temperature of the resin component W is decreased to a predetermined temperature at which the pressing force is reduced, the pressing force reduction instructing section 22 instructs the pressure control section 24 to reduce the pressing force which is being applied to the resin component W. The pressing force reduction instructing section 22 obtains the temperature of the resin component W from, for example, a temperature sensor (not illustrated) of the table 9.

The glass transition point calculation section 26 calculates the glass transition point (Tg) of the resin component W in accordance with the relationship (see FIG. 4) between the curing reaction rate (non-reaction rate) of the resin component W and the glass transition point (Tg) of the resin component W.

That is, the glass transition point calculation section 26 obtains, as the curing reaction rate (non-reaction rate) of the resin component W, a reaction rate of the resin component W, which reaction rate has been calculated by a reaction rate calculation section 54 (later described) of the DSC device 50. Then, the glass transition point calculation section 26 calculates the glass transition point (Tg) of the resin component W on the basis of the reaction rate thus obtained. The glass transition point calculation section 26 supplies, to the pressing force reduction instructing section 22 and the pressure control section 24, information indicative of the glass transition point (Tg) thus calculated.

It will be later described in detail how the pressing force reduction instructing section 22 and the pressure control section 24 carry out temperature and pressure control, particularly in a case where a wafer level lens array is cooled.

The position detection section 41 obtains (i) an X-coordinate position of the table 9 from a linear scale of the X-axis servomotor mechanism 12 and (ii) a Y-coordinate position of the table 9 from a linear scale of the Y-axis servomotor mechanism 13.

The upper mold MU and the lower mold ML are metal molds for molding a resin. The upper mold MU and the lower mold ML are paired so as to mold the resin component W in a state in which the resin component W is sandwiched between the upper mold MU and the lower mold ML, the resin component W being a molding target product which is provided between the upper mold MU and the lower mold ML. That is, the wafer level lens array manufacturing apparatus 1 molds the resin component W in a state in which the resin component W is sandwiched between the upper mold MU and the lower mold ML.

The upper mold MU is provided on a surface of the upper mold holding section 8 which surface faces the table 9. The lower mold ML is provided on a surface of the table 9 which surface faces the upper mold holding section 8.

The plurality of pillars 4, which are provided on the lower base member 3 while extending in the Z-axis direction, support the upper base member 2. The plurality of pillars 4 are provided so as to connect respective corners of the lower base member 3 and the upper base member 2 which corners face each other, and the total number of the plurality of pillars 4 is, for example, four. Note that the number of the plurality of pillars 4 is not particularly limited to four provided that the number is large enough to support the upper base member 2.

The servomotor 11 and the ball screw 6 are driving sections for moving the support 7 and the upper mold holding section 8 in the Z-axis direction.

The servomotor 11 is instructed by the motor control section 21 to be driven to rotate the ball screw 6. For example, the servomotor 11 is provided on an upper surface of the upper base member 2.

While extending in the Z-axis direction, the ball screw 6 is provided so as to be lower than the upper base member 2 and to be located directly on the upper base member 2 or below the upper base member 2 via the load cell 15.

The support 7 supports the upper mold holding section 8 from above. The plurality of pillars 4 are provided so as to be through respective four corners of the support 7. The ball screw 6 is provided in an interior of the support 7 by being inserted from the upper surface side of the support 7. In a case where the ball screw 6 rotates, the support 7 moves up and down in a direction in which the ball screw 6 extends, i.e., in the Z-axis direction.

In accordance with the movement of the support 7 in the Z-axis direction, the upper mold holding section 8 and the upper mold MU also move in the Z-axis direction.

The upper mold holding section 8 holds the upper mold MU from above. The upper mold holding section 8 includes a heat source and a temperature sensor (which are not illustrated). The upper mold holding section 8 is instructed by the temperature control section 31 to transmit heat of the heat source to the upper mold MU by raising a temperature of the heat source. Further, the upper mold holding section 8 is instructed by the temperature control section 31 to supply, to the temperature control section 31, temperature information on the upper mold MU which temperature information has been detected by the temperature sensor.

The load cell 15 detects a pressure (pressing force) for pressing a resin component W by the upper mold MU, and supplies, to the pressure control section 24 of the control section 20, information indicative of the detected pressing force. The load cell 15 is provided on, for example, a lower surface of the upper base member 2 (a surface of the upper base member 2 which surface faces the support 7).

The table 9 moves in the X-axis direction, the Y-axis direction, and the C-axis direction. The lower mold ML is provided on an upper surface of the table 9 (a surface of the table 9 which surface faces the upper mold holding section 8). The table 9 includes a heat source and a temperature sensor (which are not illustrated).

The table 9 is instructed by the temperature control section 31 to transmit heat of the heat source of the table 9 to the lower mold ML by raising a temperature of that heat source. In a case where the resin component W, which is a heat-curable resin, is heated via the upper mold MU and the lower mold ML, a curing reaction of the resin component W progresses, so that the resin component W is cured. Further, the table 9 is instructed by the temperature control section to supply, to the temperature control section 31, temperature information on the lower mold ML which temperature information has been detected by the temperature sensor of the table 9.

The X-axis servomotor mechanism 12 and the Y-axis servomotor mechanism 13 are provided so as to be lower than the table 9 and to be located between the table 9 and the lower base member 3. Either one of the X-axis servomotor mechanism 12 and the Y-axis servomotor mechanism 13 may be provided so as to be upper or lower than the other of the X-axis servomotor mechanism 12 and the Y-axis servomotor mechanism 13. For example, it is assumed that the X-axis servomotor mechanism 12 is provided so as to be lower than the Y-axis servomotor mechanism 13, i.e., the Y-axis servomotor mechanism 13 is provided so as to be upper than the X-axis servomotor mechanism 12.

The X-axis servomotor mechanism 12 is a driving section for moving the table 9 and the lower mold ML in the X-axis direction by being instructed by the motor control section 21. The X-axis servomotor mechanism 12 includes a servomotor 12a and an X-axis linear scale 12b. The X-axis linear scale 12b makes it possible to detect an X-axis position of the table 9. The X-axis linear scale 12b supplies, to the position detection section 41, information indicative of the detected X-axis position of the table 9.

The Y-axis servomotor mechanism 13 is a driving section for moving, in response to an instruction from the motor control section 21, the table 9 and the lower mold ML in the Y-axis direction. The Y-axis servomotor mechanism 13 includes a servomotor 13a and a Y-axis linear scale 13b. The Y-axis linear scale 13b makes it possible to detect a position of the table 9 on the Y-axis. The Y-axis linear scale 13b supplies, to the position detection section 41, information indicative of the detected Y-axis position of the table 9.

The motor control section 21 is a controller for controlling driving of the servomotor 11, the respective servomotors 12a and 13a of the X-axis servomotor mechanism 12 and the Y-axis servomotor mechanism 13, and the C-axis moving mechanism.

By applying an electric current to each of the servomotors 11, 12a, and 13a, the motor control section 21 drives the servomotors 12a and 13a. By controlling electric currents to flow through the servomotors 11, 12a and 13a, the motor control section 21 terminates driving of the servomotors 11, 12a and 13a in the X-axis direction, the Y-axis direction, and the Z-axis direction (or the motor control section 21 fixes positions of the servomotors 11, 12a and 13a in the X-axis direction, the Y-axis direction, and the Z-axis direction).

By driving the servomotor 11, the motor control section 21 lowers the support 7, the upper mold holding section 8, and the upper mold MU in the Z-axis direction. The motor control section 21 lowers the upper mold MU in the Z-axis direction until the pressure control section 24 obtains, from the load cell 15, information that the pressing force has reached a given value. When the pressure control section 24 obtains that information from the load cell 15, the motor control section 21 terminates the lowering of the upper mold MU and fixes the upper mold MU at a position at which the lowering of the upper mold MU is terminated.

Further, the motor control section 21 adjusts the X-coordinate and Y-coordinate positions of the table 9 by controlling driving of the servomotors 12a and 13a. The motor control section 21 thus adjusts relative positions of the upper mold MU and the lower mold ML. In a case where the relative positions of the upper mold MU and the lower mold ML become a predetermined position, the motor control section 21 applies a retaining force to the table 9 by applying a given electric current to each of the servomotors 12a and 13a. This fixes the X-coordinate and Y-coordinate position of the table 9.

The timer 25 starts time counting at a time when the temperature control section 31 starts heating the respective heat sources of the upper mold holding section 8 and the table 9. Then, the timer 25 supplies, to the transmission and reception section 23, information indicative of an elapsed time having elapsed from the start of time counting.

Note that the timer 25 can be configured to determine a curing reaction of a resin component W during molding of the resin component W. Specifically, the timer 25 can be configured to determine, under a given heating condition of the resin component W, a curing reaction rate and a degree of cure of the resin component W in accordance with only a time period during which the resin component W has been heated. This is because a desired curing point (a point P in FIG. 8) can be found in advance based on, for example, a property of the resin component W, a heating temperature, and a heating time.

The DSC device 50 with which the wafer level lens array manufacturing apparatus 1 is provided is connected to the wafer level lens array manufacturing apparatus 1 so as to communicate with the wafer level lens array manufacturing apparatus 1 via, for example, the control section 20 of the wafer level lens array manufacturing apparatus 1.

The transmission and reception section 23 functions as an interface with the DSC device 50. The transmission and reception section 23 is online connected with a transmission and reception section 51 which serves as an interface section of the DSC device 50. Note that the transmission and reception section 23 and the transmission and reception section 51 may be connected either by wire or wirelessly.

The transmission and reception section 23 supplies, to the transmission and reception section 51 of the DSC device 50, (i) information indicative of an elapsed time obtained from the timer 25 and (ii) temperature information obtained from the temperature control section 31. When the transmission and reception section 23 obtains servo-free instruction information supplied from the transmission and reception section 51 of the DSC device 50, the transmission and reception section 23 supplies the obtained servo-free instruction information to the motor control section 21.

When the motor control section 21 obtains the servo-free instruction information from the transmission and reception section 23, the motor control section 21 terminates an output of an electric current to be flowed through each of the servomotors 12a and 13a, and releases a retaining force for retaining the table 9 in the X-axis and Y-axis directions. That is, the motor control section 21 causes the servomotors 12a and 13a to be in a servo-free state.

The temperature control section 31 controls the temperatures of the upper mold MU and the lower mold ML by carrying out driving control with respect to the heat sources (not illustrated) which are provided for the upper mold holding section 8 and the table 9, respectively. The temperature control section 31 obtains (i) the temperature information of the upper mold MU from the temperature sensor provided for the upper mold holding section 8 and (ii) the temperature information of the lower mold ML from the temperature sensor provided for the table 9. The temperature control section 31 supplies, to the transmission and reception section 23, the respective pieces of temperature information of the upper mold MU and the lower mold ML.

The position detection section 41 obtains, at predetermined time intervals, an X-coordinate position of the table 9 by obtaining information from the linear scale 12b. The position detection section 41 obtains, at predetermined time intervals, a Y-coordinate position of the table 9 by obtaining information from the linear scale 13b.

As described later with reference to FIG. 8, in a period in which curing of the resin component W progresses during molding and then the resin component W reaches a point in a vicinity of its curing point, the table 9 has a smaller moving amount per unit time than in the other period.

By observing how much the table 9 moves per unit time during molding of the resin component W, the position detection section 41 detects a curing point which precedes a point at which the resin component W is mold-released.

The position detection section 41 can detect the curing point of the resin composition W by observing how much the table 9 moves per unit time during molding of the resin component W, by use of various methods. For example, by determining, from the X-coordinate and Y-coordinate positions obtained per unit time from the respective linear scales 12b and 13b, that a moving amount per unit time of the X-coordinate and Y-coordinate positions of the table 9 is not more than a predetermined value and that moving amount has been repeatedly obtained a predetermined number of times, the position detection section 41 determines that the resin component W has reached the curing point.

When the position detection section 41 determines that the resin component W has reached the curing point, the position detection section 41 supplies, to the motor control section 21, information that the position detection section 41 has detected the curing point of the resin component W.

In order to observe a curing state of a resin component W which is being molded by the wafer level lens array manufacturing apparatus 1, the DSC device 50 finds a heating value of the resin component W and calculates a reaction rate of the resin component W. That is, by calculating the reaction rate, the DSC device 50 detects a curing point which precedes a point at which the resin component W is mold-released. Note that the DSC device 50 is not particularly limited, provided that the DSC device 50 can determine the curing state of the resin component W which is being molded by the wafer level lens array manufacturing apparatus 1. That is, any device which employs any determining means can be substituted for the DSC device 50.

The DSC device 50 includes the transmission and reception section 51, a memory section 52, a heating value calculation section 53, and the reaction rate calculation section 54 (curing determination section).

The transmission and reception section 51 functions as an interface with the control section 20. When the transmission and reception section 51 obtains servo-free instruction information from the reaction rate calculation section 54, the transmission and reception section 51 supplies the obtained servo-free instruction information to the transmission and reception section 23. Further, when the transmission and reception section 51 obtains the information indicative of the elapsed time and the temperature information from the transmission and reception section 23, the transmission and reception section supplies the information indicative of the obtained elapsed time and the obtained temperature information to the heating value calculation section 53.

The memory section 52 stores in advance a heating value which is necessary for a resin material of the resin component W to be cured (such a heating value is referred to as a heating value REF). The heating value REF stored in the memory section 52 is, for example, measured in advance by use of the DSC device 50. The heating value REF is a heating value (i) at which the resin material of the resin component W is considered to have been sufficiently cured and (ii) which is obtained before the resin component W is released from the upper mold MU and the lower mold ML.

When the heating value calculation section 53 obtains the information indicative of the elapsed time and the temperature information from the transmission and reception section 51, the heating value calculation section 53 calculates in real time, in accordance with the obtained elapsed time and the obtained temperature information, a heating value of the resin component W which is being molded (such a heating value is referred to as a heating value SAM). The heating value calculation section 53 supplies, to the reaction rate calculation section 54, information indicative of the calculated heating value SAM.

The reaction rate calculation section 54 finds the reaction rate of the resin material of the resin component W which is being molded. That is, the reaction rate calculation section 54, which has found that a resin of the resin component W sandwiched between the upper mold MU and the lower mold ML has a heating value exceeding a predetermined value, determines that the resin material has been cured. Then, the reaction rate calculation section 54 calculates a reaction rate of such a curing reaction.

More specifically, in accordance with (i) the heating value SAM calculated by the heating value calculation section 53 and (ii) the heating value REF stored in the memory section 52, the reaction rate calculation section 54 calculates a reaction rate of the resin component W which is being molded. The reaction rate calculation section 54 finds the reaction rate based on the following (Equation 1):

(Reaction rate)=(1−(heating value $SAM$)/(heating value $REF$)×100   (Equation 1)

When the found reaction rate is not less than 80%, the reaction rate calculation section 54 considers that the resin component W has been cured, and supplies, to the transmission and reception section 51, the servo-free instruction information which is information that the curing point has been detected.

Further, when the found reaction rate is not less than 80%, the reaction rate calculation section 54 supplies, to the glass transition point calculation section 26, information indicative of the found reaction rate.

(Overview of Operation of Wafer Level Lens Array Manufacturing Apparatus)

Figure 2:
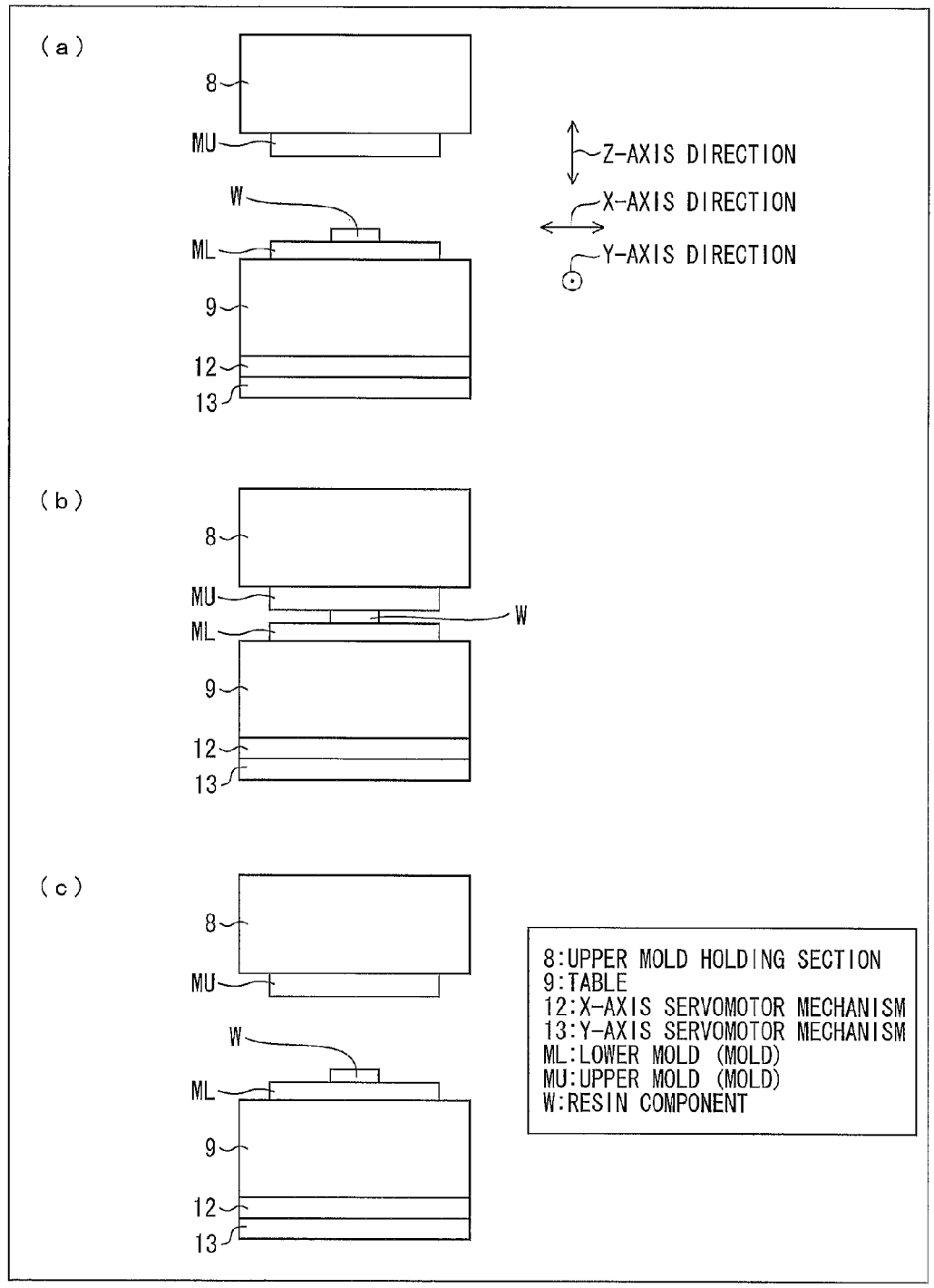
FIG. 2 is a view illustrating a molding operation of the wafer level lens array manufacturing apparatus in accordance with the aspect of the present invention.
Figure 3:
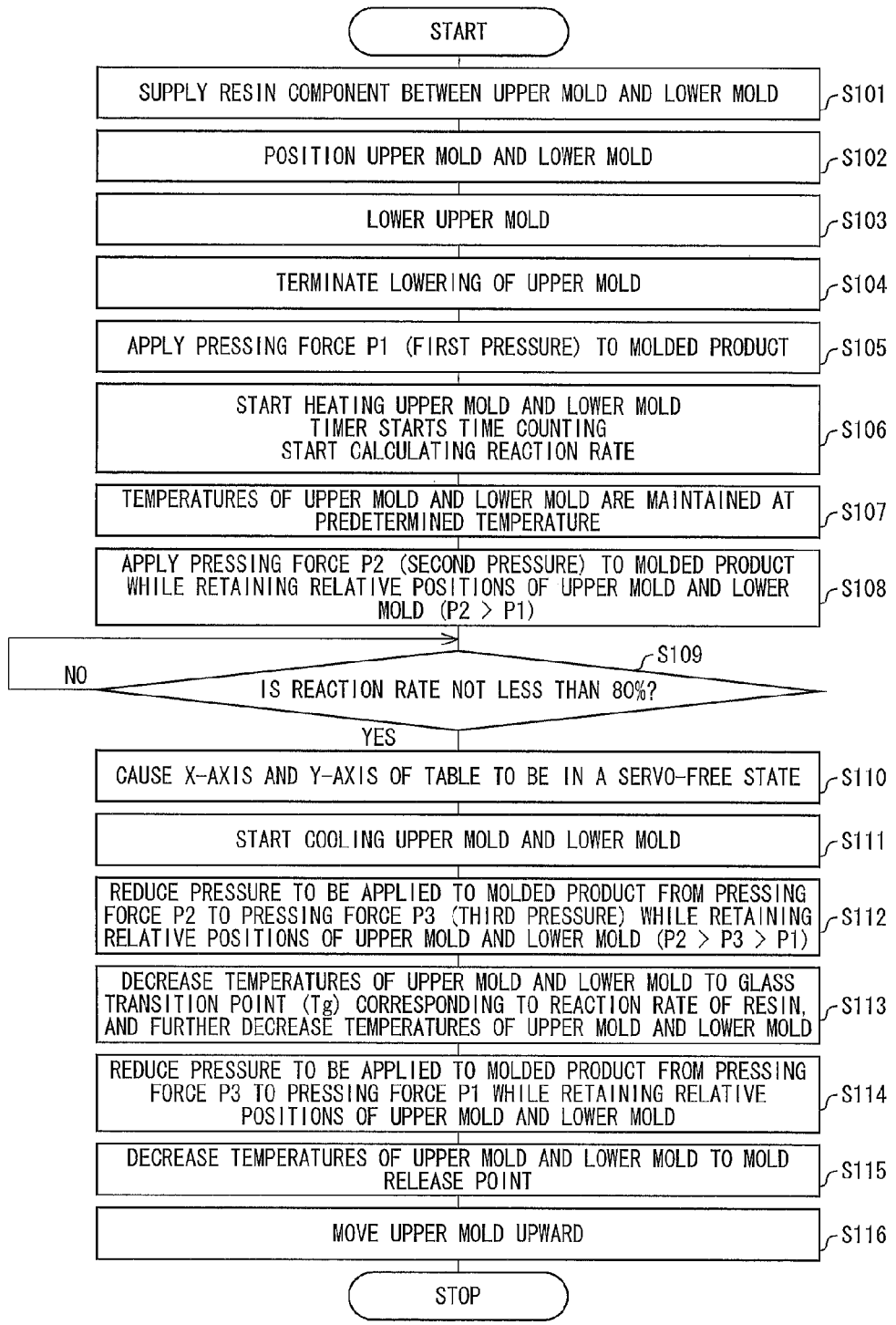
FIG. 3 is a flowchart illustrating how a wafer level lens array is molded and then mold-released by a wafer level lens array manufacturing method in accordance with an aspect of the present invention.

The following description will discuss, with reference FIGS. 2 and 3, an overview of an operation of the wafer level lens array manufacturing apparatus 1.

FIG. 2 is a view illustrating a molding operation of the wafer level lens array manufacturing apparatus 1.

FIG. 3 is a flowchart illustrating how a wafer level lens array is molded and then mold-released by a wafer level lens array manufacturing method in accordance with an aspect of the present invention.

As illustrated in (a) of FIG. 2, the resin component W which is to be molded is provided on the lower mold ML which is provided on the table 9, for example, by being applied on or poured into the lower mold ML. The resin component W is supplied to the upper mold MU and the lower mold ML, each of which has a stand-by temperature (step 101 in FIG. 3, step 101 is hereinafter abbreviated to S101).

The upper mold MU and the lower mold ML are positioned so that a molded product is formed in a state in which the resin component W is properly sandwiched between the upper mold MU and the lower mold ML (S102 in FIG. 3).

As illustrated in (b) of FIG. 2, in a case where the motor control section 21 causes the upper mold holding section 8 to be lowered in the Z-axis direction (S103 in FIG. 3), the resin component W is brought into contact with the upper mold MU, so that the resin component W is sandwiched between the upper mold MU and the lower mold ML. Then, the lowering of the upper mold MU is terminated (S104 in FIG. 3).

When the lowering of the upper mold MU is terminated, the pressure control section 24 instructs the motor control section 21 to control the servomotor 11 so that the upper mold holding section 8 and the upper mold MU apply a given pressing force P1 (first pressure, initial pressure) in the vertically downward direction to the resin component W (S105 in FIG. 3). In order to prevent the table 9 and the lower mold ML from moving in X and Y directions, the X-axis servomotor mechanism 12 and the Y-axis servomotor mechanism 13 apply, to the table 9 and the lower mold ML, a retaining force for fixing positions of the table 9 and the lower mold ML.

When the upper mold MU has the given pressing force P1 in the vertically downward direction, heating of the upper mold MU and the lower mold ML is started by the temperature control section 31, and the respective temperatures of the upper mold MU and the lower mold ML are increased to be not less than a temperature at which the resin component W is cured. This starts curing of the resin component W. When the upper mold MU and the lower mold ML start to be heated, the timer 25 starts time counting, and the reaction rate calculation section 54 starts calculating a reaction rate of the resin component W (S106 in FIG. 3).

When the respective temperatures of the upper mold MU and the lower mold ML reach a predetermined temperature (e.g., a mold temperature T2 in FIG. 5), a curing reaction of the resin component W progresses while the predetermined temperature is being maintained (S107 in FIG. 3). That is, when the respective temperatures of the upper mold MU and the lower mold ML start to be increased to a set temperature (T2) and then reach the set temperature, the set temperature is maintained so that curing of the resin component W progresses.

As the curing reaction of the resin component W progresses, shrinkage (also called "molding shrinkage") of a resin occurs caused by the curing reaction, and a negative pressure is generated in each of the upper mold MU and the lower mold ML. This causes respective pressures of the upper mold MU and the lower mold ML to be temporarily not higher than the pressing force P1. Occurrence of such a temporal pressure reduction causes the pressure control section 24 to instruct the motor control section 21 to increase, from the pressing force P1 to a pressing force P2 (second pressure) (see FIG. 6 to be later described), a set value for the pressing force of the upper mold MU in the vertically downward direction (S108 in FIG. 3). This makes it possible to apply a large pressing force to the upper mold MU and the lower mold ML so as to transfer respective shapes of the upper mold MU and the lower mold ML to the resin component W.

As has been described, when a result of calculation by the reaction rate calculation section 54 shows that the reaction rate of the resin component W has reached not less than 80% (but less than 100%) (YES at S109 in FIG. 3), the reaction rate calculation section 54 considers that the resin component W has been cured, and supplies, to the transmission and reception section 51, servo-free instruction information which is information that a curing point has been detected.

Then, the motor control section 21 releases a retaining force applied to the table 9 by (i) the servomotor 12a for moving the table 9 in the X-axis direction and (ii) the servomotor 13a for moving the table 9 in the Y-axis direction. (i.e., the motor control section 21 causes the servomotors 12a and 13a to be in a servo-free state (S110 in FIG. 3).

The reason why the retaining force is released is that a specific volume of the resin component W starts decreasing in a case where the resin components starts gelling in the upper mold MU and the lower mold ML, so that a rapid shrinkage occurs in the resin component W (see FIG. 8 to be later described). In a case where curing of the resin component W adhering to each of the upper mold MU and the lower mold ML progresses by the rapid shrinkage, internal distortion of the resin component W occurs in the upper mold MU and the lower mold ML. Progress of the rapid shrinkage in accordance with the curing of the resin component W causes the retaining force for retaining the X-coordinate and Y-coordinate positions of the table 9 to be ineffective, so that the adhering resin component W is released from the internal distortion. Then, it becomes impossible to retain the relative positions of the upper mold MU and the lower mold ML. On this account, the wafer level lens array manufacturing apparatus 1 causes the X-axis and Y-axis of the table 9 to be in a servo-free state before the adhering resin component W is released from the internal distortion.

According to this, the lower mold ML on the table 9 from which the retaining force has been released follows the upper mold MU by the pressing force of the upper mold holding section 8 in the vertical direction. This makes it possible to retain the relative positions of the lower mold ML and the upper mold MU, and to allow an increase in accuracy per unit area of an optical functional surface of the resin component W which has been molded (later described).

Figure 8:
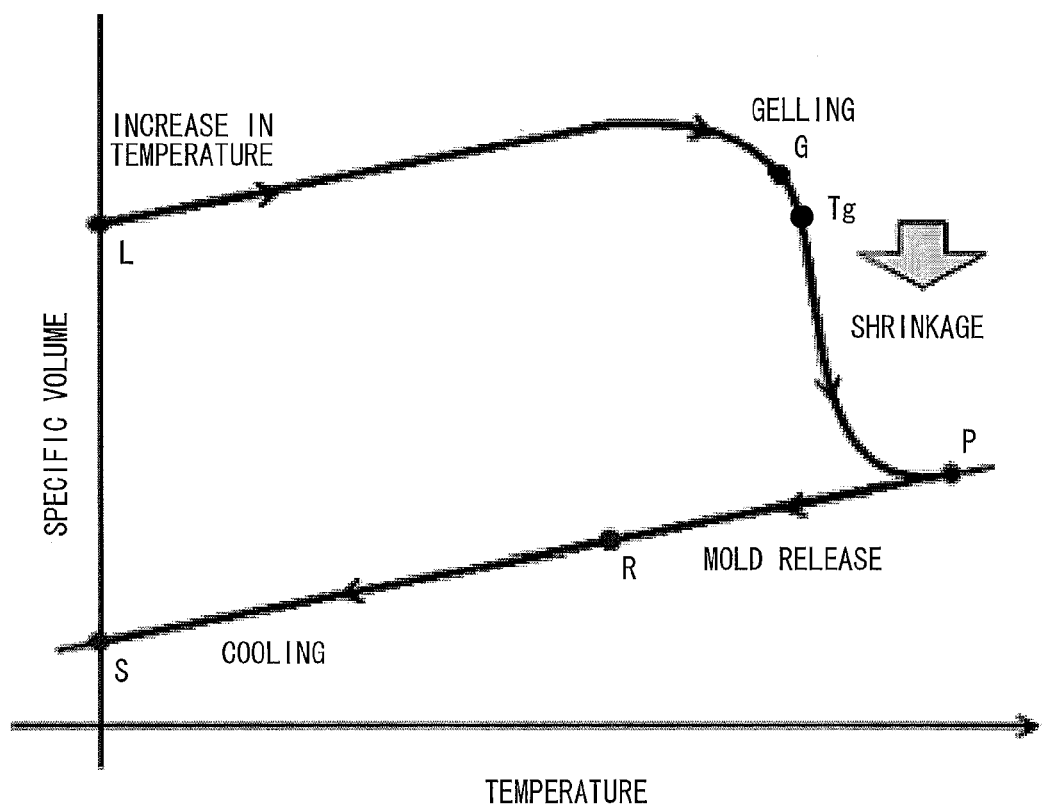
FIG. 8 is a view illustrating a relationship between (i) a change in state of a heat-curable resin which is cured in a case where a crosslinking reaction of molecules progresses by heating the heat-curable resin and (ii) a specific volume of the heat-curable resin, the relationship being associated with each step of the wafer level lens array manufacturing method.

A timing at which the X-axis and Y-axis of the table 9 are caused to be in a servo-free state is determined in accordance with, for example, a resin characteristic (PVT characteristic) illustrated in FIG. 8. A change in specific volume of the resin component W will be later described in detail.

When the curing reaction of the resin component W reaches not less than 80%, the upper mold MU and the lower mold ML start to be cooled (S111 in FIG. 3). The lower mold ML and the upper mold MU preferably start to be cooled by supplying a cooling medium (coolant) to a cooling unit (not illustrated) provided for at least one of (i) the upper mold holding section 8 which supports the upper mold MU and (ii) the table 9 which supports the lower mold ML. Note that, in order to cool the upper mold MU and the lower mold ML at a preferable temperature decrease rate (a rate at which the respective temperatures of the lower mold ML and the upper mold MU decrease per unit time), it is preferable to configure the wafer level lens array manufacturing apparatus 1 to include means for managing and controlling a temperature and a flow rate of the cooling medium.

In a case where a high pressure continues to be applied to the resin component W while the curing reaction of the resin component W is progressing, the resin component W results in being subjected to an excessive pressure. This causes a distortion in the resin component W. As the temperature of the resin component W is lower than the glass transition point (Tg) of the resin component W after the upper mold MU and the lower mold ML start to be cooled from the curing point, the resin component W has a higher elastic modulus. Therefore, in a case where the resin component W is subjected to an excessive pressing force while the resin component W has such a higher elastic modulus, a distortion (internal distortion) occurs in the resin component W, so that the distortion is highly likely to remain in a molded product (the resin component W). In order to prevent the distortion from occurring and remaining in the resin component W, it is desirable to reduce the pressing force before the resin component W is cooled to the transition point (Tg) of the resin component W (see FIG. 8). It is further desirable to further reduce the pressing force when the temperature of the resin component W falls below the glass transition point (Tg). Note that the glass transition point (Tg) of the resin component W depends on the reaction rate of the resin component W (later described with reference to FIG. 4).

The following describes an example in which (i) at least one-stage pressure reduction is carried out in a time period in which the resin component W is cooled to the glass transition point (Tg) after being cured, the glass transition point (Tg) corresponding to the curing reaction rate of the resin component W, and (ii) at least another one-stage pressure reduction is further carried out when the resin component W has a temperature that is not more than the glass transition point (Tg).

Specifically, during cooling of the lower mold ML and the upper mold MU from a temperature at the curing point P (see FIG. 8) to the glass transition point (Tg), the pressing force reduction instructing section 22 instructs the pressure control section 24 to reduce, from the pressing force P2 to a pressing force P3 (third pressure), the pressure which is being applied to the resin component W (S112 in FIG. 3). Note here that the pressing force P2>the pressing force P3>the pressing force P1.

For example, in a case of a resin component W having a reaction rate of 80%, the pressure which is being applied to the resin component W is reduced from the pressing force P2 to the pressing force P3 before the temperature of the resin component W decreases to approximately 80° C. (glass transition point (Tg): see FIG. 8). Note that details of this will be later described with reference to FIG. 4. During S112, the relative positions of the lower mold ML and the upper mold MU are being retained.

Note that pressure reduction is not limited to one-stage pressure reduction from the pressing force P2 to the pressing force P3. Alternatively, two- or more-stage pressure reduction can be carried out.

The resin component W is further cooled while being subjected to the pressing force P3 (S113 in FIG. 3). The pressure is reduced from the pressing force P3 to the pressing force P1 (S114 in FIG. 3) before the temperature of the resin component W decreases to a temperature at which the resin component W is mold-released (a mold release point R; see FIG. 8), desirably, when the temperature of the resin component W falls below the glass transition point (Tg). During S114, the relative positions of the lower mold ML and the upper mold MU are also being retained.

Note that pressure reduction is not limited to one-stage pressure reduction from the pressing force P3 to the pressing force P1. Alternatively, two- or more-stage pressure reduction can be carried out.

That is, during a process in which the lower mold ML and the upper mold MU are cooled, the pressure (pressing force) which is being applied to the resin component W is reduced in stages. Specifically, the pressing force is reduced before the temperature of the resin component W decreases to the glass transition point (Tg), and then the pressing force is reduced before the temperature of the resin component W further decreases from the glass transition point (Tg) to the mold release point R.

When the respective temperatures of the lower mold ML and the upper mold MU decrease to the mold release point R (S115 in FIG. 3), the motor control section 21 drives the servomotor 11 to move the upper mold holding section 8 and the upper mold MU in a vertically upward direction, as illustrated in (c) of FIG. 2 (S116 in FIG. 3). This completes the resin component W which has been molded (molded product), so that the completed resin component W can be taken out.

(Relationship Between Non-Reaction Rate of Curing Reaction of Resin and Glass Transition Point)

Figure 4:
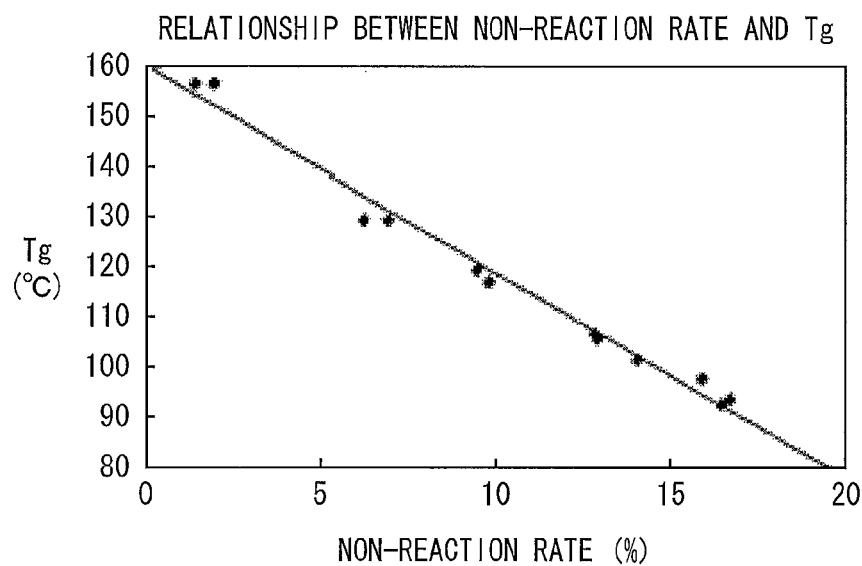
FIG. 4 is a view illustrating a relationship between a non-reaction rate (%) of a resin and a glass transition point (° C.).

The following briefly describes, with reference to FIG. 4, a non-reaction rate (%) of the resin component W and the glass transition point (° C.). First, the glass transition point and the non-reaction rate will be briefly described below.

The glass transition point is a temperature at which a resin changes to a noncrystalline glassy solid state. The glass transition point is measured, for example, as below.

A resin (sample) whose glass transition point is to be measured, and a reference material (a material, such as alumina, which does not change physical property within a temperature range within which the glass transition point of the resin is measured) are stored and heated in a heater. A temperature of the reference material whose physical property does not change changes uniformly. Meanwhile, a temperature of the resin does not change uniformly because a heat capacity and a thermal expansion coefficient of the resin change when a change in state (phase transition) such as glass transition, crystallization, or melting occurs in the resin. By using such a non-uniform change in temperature of the resin, it is possible to measure the glass transition point. Such a measurement method is called DSC (differential scanning calorimetry).

Note that the DAC device 50 of the wafer level lens array manufacturing apparatus 1 calculates the reaction rate of the resin component W according to the principle of the differential scanning calorimetry.

The non-reaction rate (%) of the resin component W represents, by percent (%), how much the curing reaction of the resin component W has not been completed.

FIG. 4 illustrates a relationship between a non-reaction rate (%) of a resin and a glass transition point (° C.).

FIG. 4 is obtained by plotting 12 measurement results of respective glass transition points of molded resin products (lenses) having different non-reaction rates (%). FIG. 4 also illustrates a primary regression line obtained by carrying out a least squares method with respect to each of the 12 glass transition points.

According to an example of the resins (see FIG. 4), (i) the molded resin product whose non-reaction rate is 20% (i.e., a reaction rate is 80%) has a glass transition point of approximately 80° C., and (ii) the molded resin product whose non-reaction rate is 10% (i.e., the reaction rate is 90%) has a glass transition point of approximately 115° C. As is clear from FIG. 4, as the resin component W has a higher non-reaction rate (%), the resin component W has a lower glass transition point (Tg). Further, the relationship between the non-reaction rate (%) and the glass transition point Tg is shown by a substantially straight line.

In a case where a molded resin product which is made of the resin component W is, for example, a lens, the above-described distortion of the resin component W serves as a main cause of a deterioration in optical property of the lens.

In view of the problem of the distortion, according to the wafer level lens array manufacturing apparatus 1 in accordance with an aspect of the present invention, the lower mold ML and the upper mold MU start to be cooled when the resin component W has a curing reaction rate of not less than 80%, and before the resin component W is cooled to, for example, the glass transition point (Tg), the pressure which is being applied to the resin component W is reduced from the pressing force P2 to the pressing force P3 (described earlier). Note here that the pressing force P2>the pressing force P3>the pressing force P1. When the pressure which is being applied to the resin component W is reduced from the pressing force P2 to the pressing force P3, the relative positions of the lower mold ML and the upper mold MU are being retained.

Such pressure reduction from the pressing force P2 to the pressing force P3 prevents application of an excessive pressure to the resin component W after the resin component W has a higher elastic modulus during the process in which the lower mold ML and the upper mold MU are cooled. Further, the pressure which is being applied to the resin component W is reduced from the pressing force P3 to the pressing force P1 when the temperature of the resin component W falls below the glass transition point (Tg). This makes it possible to cool and mold-release the resin component W (molded product) while preventing occurrence of a distortion in the resin component W.

Note that the non-reaction rate (%) of the resin component W can alternatively be calculated by measuring an amount of a functional group (i) which is contained in a chemical structure of a molecule which is a main component of the resin component W, and (ii) which changes in structure in accordance with an intermolecular crosslinking reaction. Examples of the functional group include an epoxy ring which is cleaved by an intermolecular crosslinking reaction and disappears.

Specifically, the non-reaction rate (%) of the resin component W can be calculated as below. First, measured are (i) a contained amount $\alpha$ of a functional group R contained in a resin component W whose curing reaction has not been started and (ii) a contained amount $\beta$ of the functional group R contained in a resin component W whose curing reaction has been completed. A difference between the contained amount $\alpha$ and the contained amount $\beta$ ($\alpha-\beta$) is a degree of change in contained amount of the functional group R obtained before and after the curing reaction in a case where a reaction rate of the curing reaction is 100%. Next, measured is a contained amount $\gamma$ ($\gamma \geq \beta$) of the functional group R contained in a resin component W whose non-reaction rate (%) is desired to be calculated, and then $(\gamma-\beta)/(\alpha-\beta)\times100$ is calculated. The non-reaction rate (%) of the resin component W can thus be found.

For example, Raman spectrometry or an infrared spectroscopy (e.g., FT-IR) can be suitably used to measure the contained amount of the functional group so as to quantify the non-reaction rate of the resin component W.

The wafer level lens array manufacturing apparatus 1 can include, instead of the DSC device 50, the above-described means for calculating a reaction rate by a measurement method focusing on a chemical structure of the resin component W.

(Factor which Makes it Difficult to Mold-Release Molded Product)

Examples of a factor which (i) causes a molded product (e.g., the resin component W or a wafer level lens array) to strongly adhere to a mold (e.g., the lower mold ML and the upper mold MU which have been described earlier) and (ii) makes it difficult to release the molded product from the mold include (1) an intermolecular force, (2) the shape of the mold, (3) a vacuum suction force, (4) an electrostatic force, or (5) molding shrinkage.

(1) The intermolecular force is an attraction force exerted between (i) molecules of the mold on a surface of the mold on which surface the mold is in contact with a resin and (ii) molecules of the molded product on a surface of the molded product.

(2) The shape of the mold is (i) a shape of the whole contact surface where the molded product is in contact with the mold and (ii) a shape of unevenness provided on the contact surface.

(3) The vacuum suction force is a force which causes an outside atmospheric pressure to be exerted so that the molded product is pressed toward the mold, the force being produced because a gap made between the molded product and the mold by releasing the molded product from the mold has an atmospheric pressure lower than the outside atmospheric pressure.

(4) The electrostatic force is electric charges which are produced on respective surfaces of the mold and the molded product when the molded product is released from the mold and which cause the mold and the molded product to be attracted to each other.

(5) The molding shrinkage is a phenomenon in which the molded product shrinks in volume when the resin etc. in a liquid state is cured. Larger shrinkage of the molded product than a change in size (e.g., volume) of the mold causes the molded product to strongly adhere to unevenness of the mold.

Among the above (1) through (5), (5) Molding shrinkage makes it the most difficult to release the molded product from the mold.

For example, in a case where during a process in which a wafer level lens array which has been molded is mold-released, an excessive load (pressing force) is applied to the wafer level lens array, damage such as deformation or a crack may occur in a lens. It is therefore important to smoothly release, from a mold, the lens which has strongly adhered to the mold while preventing a deterioration in quality and productivity of the lens.

(Example of Wafer Level Lens Array Manufacturing Method)

Figure 5:
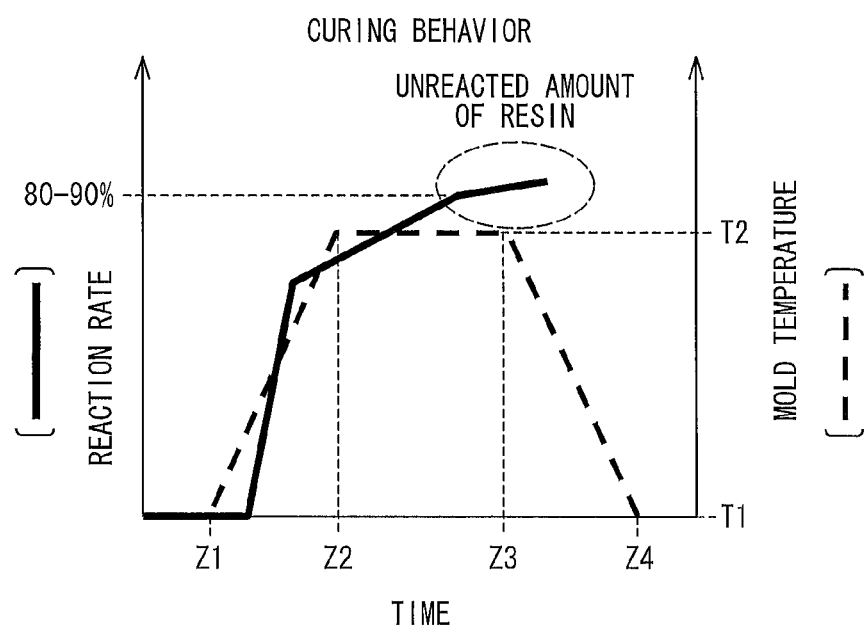
FIG. 5 is a view schematically illustrating how (i) a curing reaction rate of a resin and (ii) a temperature of a mold (mold temperature) change over time during manufacturing of a wafer level lens array.

The following describes, with reference to FIGS. 5 and 6, an example of a wafer level lens array manufacturing method.

First, a process in which a resin is applied on or poured into a mold and then a wafer level lens array is cooled will be described below with reference to FIG. 5.

FIG. 5 is a view schematically illustrating how (i) a curing reaction rate of a resin (e.g., the resin component W or a wafer level lens array) and (ii) a temperature (mold temperature) of a mold (e.g., the lower mold ML and the upper mold MU which have been described earlier) change over time in a wafer level lens array manufacturing process in accordance with an aspect of the present invention.

First, a resin whose curing reaction has not been started because the resin has not been heated is applied on or poured into a mold (S101 in FIG. 3). The mold is heated during a time period between a time Z1 and a time Z2, so that a temperature (shown by a dash line) of the mold is increased from a temperature T1 to a temperature T2 at a given temperature increase rate (S106 in FIG. 3).

While the temperature of the mold is thus being increased, the curing reaction of the resin starts and progresses in the mold (see FIG. 5).

During a time period between the time Z2 and a time Z3, the temperature of the mold is not increased but is maintained at the temperature T2 (S107 in FIG. 3). The curing reaction of the resin further progresses during the time period from the time Z2 to the time Z3.

When the curing reaction of the resin has a reaction rate (shown by a solid line) of not less than 80% or not less than 90% (but less than 100%) (YES at S109 in FIG. 3), the mold starts to be cooled at the time Z3 (S111 in FIG. 3). Then, the temperature of the mold is decreased from the temperature T2 to the temperature T1 at a given temperature decrease rate so that the resin which has been molded is cooled (S115 in FIG. 3).

Next, the following description discusses, with reference to FIG. 6, how to change a pressure to be applied to a resin so as to release a wafer level lens array from a mold in the wafer level lens array manufacturing method of FIG. 5.

FIG. 6 is a view schematically illustrating how (i) a pressure (pressing force) to be applied to a resin and (ii) a temperature of a mold (mold temperature) change over time in the wafer level lens array manufacturing method of FIG. 5.

First, a resin whose curing reaction has not started because the resin has not been heated is applied on or poured into a mold. The mold is heated during a time period between a time Z1 and a time Z2, so that a temperature of the mold is increased from a temperature T1 to a temperature T2 at a given temperature increase rate (see dash lines in FIGS. 5 and 6). During the time period between the time Z1 and the time Z2, the pressing force P1 is applied to the resin (S105).

Molding shrinkage caused by the curing reaction of the resin occurs around the time Z2. This causes a negative pressure (pulling force; a force to be applied in a direction opposite to a direction in which a pressing force is applied) to be exerted on the mold. The negative force causes the pressing force which is being applied to the resin to be temporarily reduced from the pressing force P1.

During a time period between a time at which the negative pressure is produced and a time Z3 at which the curing reaction rate of the resin reaches 80% to 90%, the pressure which is being applied to the resin is increased to the pressing force P2 so that the resin is strongly pressed against the mold (see FIG. 5). This makes it possible to sufficiently transfer a shape of the mold to the resin (S108 in FIG. 3).

When the curing reaction rate of the resin reaches 80% to 90%, the temperature of the mold starts to be decreased so that the resin is cooled (S111 in FIG. 3). The pressing force which is being applied to the resin is reduced from the pressing force 2 to the pressing force P3 at the time Z3 before the temperature of the resin decreases to the glass transition point (Tg) corresponding to the reaction rate (or non-reaction rate) of the curing reaction of the resin (S112 in FIG. 3).

Then, the pressure which is being applied to the resin is reduced from the pressing force P3 to the pressing force P1 at a time Z5 (S114 in FIG. 3) before the temperature of the resin is decreased to a temperature (the mold release point R in FIG. 8) at which the resin is released from the mold (S113 in FIG. 3). Note here that the pressing force P2>the pressing force P3>the pressing force P1.

Thereafter, the mold is further cooled, so that the temperature of the mold is decreased to the temperature T1 at a time Z4.

That is, during a process in which the resin is cooled and mold-released by decreasing the temperature of the mold, the pressure which is being applied to the resin is reduced in stages from the pressing force P2 to the pressing force P1.

Note that the above has described an example in which the pressure which is being applied to the resin is reduced in two stages from the pressing force P2 to the pressing force P1 by reducing the pressure from the pressing force P2 to the pressing force P3, which is set as an intermediate pressure between the pressing force P2 and the pressing force P1, and then reducing the pressure from the pressing force P3 to the pressing force P1 (two-stage pressure reduction). However, how to reduce the pressing force while the temperature of the mold is being decreased (the resin is being cooled) is not limited to the above-described two-stage pressure reduction but can alternatively be multi-stage (two- or more-stage) pressure reduction.

It is further preferable to prevent application of an excessive pressing force to the resin having a temperature that is not less than the glass transition point (Tg).

(Curing Behavior of Resin)

FIG. 7 is a table showing main curing behaviors of the resin in respective temperature increasing, pressing, and curing steps carried out in the wafer level lens array manufacturing method of FIG. 6.

The resin whose temperature is being increased is in a gel state or in an indefinitely-shaped solid state. Such a resin has no fluidity. Therefore, a molded product made of the resin is basically in the gel state or in the indefinitely-shaped solid state. The resin in the gel state or in the indefinitely-shaped solid state still has a low reaction rate. Therefore, a specific volume of the resin is easily affected by the mold temperature.

The resin which is subjected to a high pressing force at a high temperature to which the resin has been increased in temperature is in a gel state or in a rubber-like state. In the pressing step, the resin is strongly pressed against the mold so that the shape of the mold is transferred to the resin. In the pressing step, a timing at which a pressure is increased is important because a specific volume and an elastic modulus of the resin depend on a curing reaction rate (degree of cure) of the resin.

As the curing reaction of the resin progresses, molding shrinkage occurs in the resin while the shape of the resin is forcibly being maintained in the mold. In a case where an excessive load is applied to the resin, damage such as deformation or a crack may occur in a lens, so that a distortion remains in a molded product.

In order to prevent the distortion from remaining in the molded product or to reduce such a distortion, it is preferable to reduce a pressing force so as to prevent an excessive pressure from being applied to the resin whose elastic modulus has increased due to the molding shrinkage.

FIG. 8 is a view illustrating a relationship between (i) a change in state of a heat-curable resin which is cured in a case where a crosslinking reaction of molecules progresses by heating the heat-curable resin and (ii) a specific volume of the heat-curable resin, the relationship being associated with each step of the wafer level lens array manufacturing method. In FIG. 8, the vertical axis shows the specific volume of the resin, and the horizontal axis shows a temperature.

Note here that the specific volume of the resin means the volume of the resin per unit mass, and is the inverse of the density of the resin. That is, an increase in specific volume of the resin means expansion of the resin, whereas a decrease in specific volume of the resin means shrinkage of the resin.

First, a resin is applied on or poured into a mold, and the mold is heated so that a temperature of the resin is increased (see a point L in FIG. 8). The resin which is being heated expands slowly. As a crosslinking reaction of molecules of the resin progresses, the molecules of the resin are linked to each other and then have a lower degree of freedom of motion of molecules, so that the resin gels (see a point G in FIG. 8).

As the curing reaction of the resin further progresses, a specific volume of the resin is rapidly reduced. Such a rapid reduction in specific volume occurs due to shrinkage (molding shrinkage) which is caused by the curing reaction of the resin.

Note that the glass transition point (Tg) of the resin exists between a gel state of the resin (the point G) and a solid state of the resin (the curing point P). That is, the glass transition point (Tg) of the resin is located between the point G and the point P (see FIG. 8). In a case where the point P, the glass transition point Tg, and the point G are arranged in descending temperature order, the point P>Tg>the point G.

Since the increase in temperature of the mold is terminated and the temperature is made constant (see the temperature T2 in FIGS. 5 and 6), the temperature of the resin is gently increased. The curing reaction rate of the resin reaches 80% to 90% at the point P. The specific volume of the resin is rapidly reduced due to the above-described molding shrinkage from the point G to the point P.

Note that the glass transition point Tg is not fixed but changes during a molding process in which the resin starts to be molded and is then mold-released. In a case where the specific volume is reduced in accordance with an increase in curing rate, the glass transition point Tg changes to be higher (see the graph of FIG. 4). In a case where the resin component W is cooled from the curing point P, the curing reaction rate decreases at a time when the resin is mold-released. Therefore, Tg changes to be lower as is clear from the graph of FIG. 4.

The resin which has been formed into a molded product shrinks slowly while being cooled from the point P to a point S. The resin is further cooled to a temperature (the mold release point R) at which the resin is released from the mold (S115 in FIG. 3). The resin which has been molded is further cooled from the mold release point R to the point S. This completes manufacturing of a wafer level lens array (S116 in FIG. 3).

CONCLUSION

A molded product manufacturing apparatus (wafer level lens array manufacturing apparatus 1) in accordance with an aspect of the present invention is configured to include: a mold (upper mold MU and lower mold ML) for molding a heat-curable resin (resin component W); a pressure control section (pressure control section 24) for controlling a pressure (pressing force) which is applied to the mold; and a temperature control section (temperature control section 31) for controlling an internal temperature of the mold, the temperature control section maintaining a heating temperature of an interior of the mold at a given temperature (temperature T2) while a curing reaction of the heat-curable resin is progressing so that the heat-curable resin is molded, and thereafter, during a process for decreasing the internal temperature of the mold, the pressure control section reducing in stages the pressure which is being applied to the mold (S112 and S114).

A molded product manufacturing method in accordance with an aspect of the present invention is configured to be a molded product manufacturing method for manufacturing a molded product by heating and pressurizing a heat-curable resin in a mold, the molded product manufacturing method comprising the steps of: maintaining a heating temperature of the mold at a given temperature while a curing reaction of the heat-curable resin is progressing so that the heat-curable resin is molded; and thereafter, during a process for decreasing a temperature of the mold, reducing in stages a pressure which is being applied to the mold.

According to the configuration and the method, the pressure which is being applied to the mold is not reduced all at a single time but is reduced in stages, during a process from a start of decrease in internal temperature of the mold to a complete release of the molded product from the mold.

This prevents an excessive load from being applied to the molded product which has been molded and is adhering to the mold due to molding shrinkage.

It is therefore possible to release the molded product from the mold by a relatively small force. This makes it possible to smoothly and easily release the molded product from the mold while preventing a deterioration in quality and productivity of the molded product.

The molded product manufacturing apparatus in accordance with the aspect of the present invention is further configured so that while the pressure control section is applying, to the mold, a second pressure (pressing force P2) which is higher than a first pressure (pressing force P1) that is an initial pressure applied to the mold when the heat-curable resin starts to be molded, the temperature control section applies, to the heat-curable resin, heat whose amount is less than an amount which is necessary for the heat-curable resin to be completely cured; and the temperature control section cools the mold while the pressure control section is applying, to the mold, a third pressure (pressing force P3) which is lower than the second pressure but is higher than the first pressure.

According to the configuration, heating is terminated when the heat-curable resin reaches a curing reaction rate at which the molded product should be manufactured. The pressure which is being applied to the mold is not reduced all at a single time but is reduced in stages.

This makes it possible to reduce a heat amount and a time which are required to manufacture the molded product. It is therefore possible to reduce manufacturing cost and to increase productivity of the molded product. Further, according to the configuration, an excessive load is prevented from being applied to the molded product which has been molded.

It is preferable to configure the molded product manufacturing apparatus in accordance with the aspect of the present invention so that a degree of cure (a curing reaction rate, a reaction rate of a curing reaction) of the heat-curable resin reaches not less than 80% but less than 100% while the heating temperature of the interior of the mold is maintained at the given temperature in a state in which the second pressure is applied to the mold by the pressure control section.

According to the configuration, it is possible to attain a satisfactory accuracy per unit area of an optical functional surface of a lens in a case where the molded product is the lens.

It is preferable to configure the molded product manufacturing apparatus in accordance with the aspect of the present invention so that before the internal temperature of the mold is decreased, by the temperature control section, from the given temperature to a glass transition temperature (grass transition point (Tg)) corresponding to the degree of cure of the heat-curable resin, the pressure control section carries out at least one-stage pressure reduction so as to reduce, from the second pressure to the third pressure, the pressure which is applied to the mold.

In a case where a high pressure continues to be applied to the resin component W while the curing reaction of the resin component W is progressing, the resin component W results in being subjected to an excessive pressure. This causes a distortion in the resin component W. As the temperature of the resin component W is lower than the glass transition point (Tg) of the resin component W after the mold starts to be cooled from a curing point, the resin component W has a higher elastic modulus. Therefore, in a case where the resin component W is subjected to an excessive pressing force while the resin component W has such a higher elastic modulus, a distortion (internal distortion) occurs in the resin component W, so that the distortion is highly likely to remain in the molded product (resin component W).

In order to prevent the distortion from occurring and remaining in the resin component W, the at least one-stage pressure reduction is carried out with respect to the pressure which is being applied to the molded product, before the temperature of the heat-curable resin which has been cured in the mold becomes, after the internal temperature of the mold starts decreasing, lower than the glass transition temperature of the heat-curable resin.

This makes it possible to, in a case where the molded product is a lens, suitably (i) prevent the distortion, which serves as a main cause of a deterioration in optical property of the lens, from occurring or remaining in the lens or (ii) reduce the distortion, during a temperature decrease process from cooling of the molded product which has been cured to a temperature at which the molded product is released from the mold.

It is therefore possible to smoothly and easily release the molded product from the mold while preventing a deterioration in quality and productivity of the molded product.

It is preferable to configure the molded product manufacturing apparatus in accordance with the aspect of the present invention so that in a case where the internal temperature of the mold is controlled by the temperature control section so that the internal temperature of the mold falls below a glass transition temperature corresponding to the degree of cure of the heat-curable resin, the pressure control section carries out at least one-stage pressure reduction so as to reduce, from the third pressure to the first pressure, the pressure which is applied to the mold.

According to the configuration, when the temperature of the resin component W falls below the glass transition point (Tg), it is possible to (i) suitably reduce the pressure which is being applied to the molded product and (ii) prevent, at an appropriate timing, an excessive pressure from being applied to the resin component W whose elastic modulus has increased.

By further cooling the molded product while applying the first pressure to the mold, it is possible to smoothly and easily release the molded product from the mold while preventing a deterioration in the quality and the productivity of the molded product.

It is preferable to configure the molded product manufacturing apparatus in accordance with the aspect of the present invention so that the pressure control section reduces the pressure which is applied to the mold from the second pressure to the first pressure, by carrying out at least two-stage pressure reduction so that the pressure which is applied to the mold is reduced from the second pressure to the third pressure and then reduced from the third pressure to the first pressure.

According to the configuration, during the process from the start of decrease in internal temperature of the mold to the complete release of the molded product from the mold, the pressure which is being applied to the mold is not reduced all at a single time but is suitably reduced so that an excessive load is not applied to the molded product which has been molded and is adhering to the mold due to molding shrinkage.

It is therefore possible to smoothly and easily release the molded product from the mold while preventing a deterioration in the quality and the productivity of the molded product.

The present invention is not limited to the description of the embodiment above, and can therefore be modified by a skilled person in the art within the scope of the claims. Namely, an embodiment derived from a proper combination of technical means disclosed in different embodiments is encompassed in the technical scope of the present invention. Further, a new technical feature can be obtained by combining technical means disclosed in the embodiment above.

[Software Implementation Example]

Blocks of the wafer level lens array manufacturing apparatus 1 (particularly, the control section 20, and the heating value calculation section 53 and the reaction rate calculation section 54 which are included in the DSC apparatus 50) may be realized by a logic circuit (hardware) provided in an integrated circuit (IC chip) or may be realized by software as executed by a CPU (Central Processing Unit).

In the latter case, the wafer level lens array manufacturing apparatus 1 includes: a CPU that executes instructions of a program which realizes the foregoing functions; ROM (Read Only Memory) storing the program; RAM (Random Access Memory) that develops the program; and a storage apparatus (storage medium), such as a memory, which stores the program and various kinds of data. The object of the present invention can be achieved, by supplying to the wafer level lens array manufacturing apparatus 1 a computer-readable storage medium storing control program codes (executable program, intermediate code program or source program) for the wafer level lens array manufacturing apparatus 1, serving as software for realizing the foregoing functions, so that the computer (or CPU or MPU) retrieves and executes the program code stored in the storage medium.

The storage medium may be "a non-transitory tangible medium", examples of which include: a tape, such as a magnetic tape or a cassette tape; a disk including (i) a magnetic disk such as a floppy (Registered Trademark) disk or a hard disk and (ii) an optical disk such as CD-ROM, MO, MD, DVD, or CD-R; a card such as an IC card (memory card) or an optical card; a semiconductor memory such as a mask ROM, EPROM, EEPROM (Registered Trademark) or flash ROM; and a logic circuit such as PLD (Programmable logic apparatus) or FPGA (Field Programmable Gate Array).

Further, the wafer level lens array manufacturing apparatus 1 can be arranged to be connectable to a communications network so that the control program codes may be made available to the wafer level lens array manufacturing apparatus 1 via the communications network. The communications network is not limited to a specific one, provided that it can transmit the control program codes. Examples of the communications network include the Internet, an intranet, extranet, LAN, ISDN, VAN, CATV communications network, virtual dedicated network (virtual private network), telephone line network, mobile communications network, and satellite communications network. The transfer medium which constitutes the communications network is not limited to a specific configuration or kind, provided that is can transmit the control program codes. Examples of the transfer medium include: wired line such as IEEE 1394, USB, electric power line, cable TV line, telephone line, or ADSL (Asymmetric Digital Subscriber Line); and wireless such as infrared radiation (IrDA, remote control), Bluetooth (Registered Trademark), IEEE 802.11 wireless, HDR (High Data Rate), NFC (Near Field Communication), DLNA (Digital Living Network Alliance) (Registered Trademark), mobile telephone network, satellite line, or terrestrial digital network. The present invention can also be implemented by the control program code in the form of a computer data signal embedded in a carrier wave which is embodied by electronic transmission.

INDUSTRIAL APPLICABILITY

The present invention is applicable to a technique for mass-producing, by use of a mold, molded products having a predetermined shape.

REFERENCE SIGNS LIST

1: Wafer level lens array manufacturing apparatus (molded product manufacturing apparatus)
6: Ball screw
8: Upper mold holding section
9: Table
11: Servomotor (first driving section)
12a and 13a: Servomotor (second driving section)
12b and 13b: Linear scale
15: Load cell
20: Control section
21: Motor control section
22: Pressing force reduction instructing section
24: Pressure control section
25: Timer
26: Glass transition point calculation section
31: Temperature control section
41: Position detection section (curing determination section)
50: DSC device
51: Transmission and reception section
52: Memory section
53: Heating value calculation section
54: Reaction rate calculation section (curing determination section)
ML: Lower mold (mold)
MU: Upper mold (mold)
P: Curing point
R: Mold release point
Tg: Glass transition point
W: Resin component (heat-curable resin)
P1: Pressing force (first pressure, initial pressure)
P2: Pressing force (second pressure)
P3: Pressing force (third pressure)

The invention claimed is:
1. A molded product manufacturing method for manufacturing a molded product by heating and pressurizing a heat-curable resin in a mold, the molded product manufacturing method comprising the steps of:
    filling a mold with a heat-curable resin;
    starting to heat the heat-curable resin after a pressure applied to the mold reaches a given first pressure and becomes stable at the given first pressure;
    increasing the pressure applied to the mold to a second pressure in response to an occurrence of a temporary reduction in the mold pressure;
    maintaining a temperature of the mold at a given temperature while a curing reaction of the heat-curable resin is progressing so that the heat-curable resin is molded; and thereafter,
    decreasing a temperature of the mold from the given temperature;
    subsequently reducing in at least one stage from the second pressure the pressure which is being applied to the mold while a temperature of the mold is decreasing and before the temperature decreases below a glass transition temperature of the heat-curable resin; and
    further reducing in at least one stage the pressure which is being applied to the mold after the temperature of the mold has been decreased below the glass transition temperature.

* * * * *